(12) United States Patent
Kubo (10) Patent No.: US 9,541,376 B2
(45) Date of Patent: Jan. 10, 2017

(54) CHROMATIC CONFOCAL SENSOR AND MEASUREMENT METHOD

(71) Applicant: Mitutoyo Corporation, Kawasaki-shi, Kanagawa (JP)

(72) Inventor: Koji Kubo, Kawasaki (JP)

(73) Assignee: MITUTOYO CORPORATION, Kawasaki-Shi (JP)

(*) Notice: Subject to any disclaimer, the term of this patent is extended or adjusted under 35 U.S.C. 154(b) by 0 days.

(21) Appl. No.: 15/054,722

(22) Filed: Feb. 26, 2016

(65) Prior Publication Data
US 2016/0258742 A1    Sep. 8, 2016

(30) Foreign Application Priority Data

Mar. 2, 2015 (JP) ................. 2015-039996
Feb. 26, 2016 (JP) ................. 2016-035124

(51) Int. Cl.
*G01J 3/28* (2006.01)
*G01B 11/02* (2006.01)
*G02B 21/00* (2006.01)

(52) U.S. Cl.
CPC ......... *G01B 11/026* (2013.01); *G02B 21/0064* (2013.01); *G01B 2210/50* (2013.01)

(58) Field of Classification Search
CPC ................. G01J 3/44; G01J 3/28; G01J 3/02; G01B 11/14

USPC ................................. 356/300–334
See application file for complete search history.

(56) References Cited

U.S. PATENT DOCUMENTS 5,369,486 A * 11/1994 Matsumoto ........... G03F 9/7049
356/488
8,427,644 B2 * 4/2013 Miki .................... G01B 11/026
356/364

FOREIGN PATENT DOCUMENTS

JP    2011-039026    2/2011

* cited by examiner

*Primary Examiner* — Abdullahi Nur
(74) *Attorney, Agent, or Firm* — Rankin, Hill & Clark LLP (57) ABSTRACT

Provided is a chromatic confocal sensor including: a light source section that emits a plurality of light beams having different wavelengths; an optical head that includes an objective lens that converges the plurality of light beams at different focal positions and selects, as measurement light, light reflected by an object to be measured at the focal position out of the plurality of light beams; a spectroscope including diffraction gratings that split the selected measurement light into a plurality of diffracted light beams and a sensor that receives two or more of the plurality of diffracted light beams; and a signal processing/control section that calculates a position of the object to be measured based on a difference between light reception positions of the two or more diffracted light beams received by the sensor.

15 Claims, 7 Drawing Sheets

CHROMATIC CONFOCAL SENSOR AND MEASUREMENT METHOD

CROSS REFERENCE TO RELATED APPLICATIONS

This application claims the benefit of Japanese Priority Patent Application JP 2015-039996 filed Mar. 2, 2015 and Japanese Priority Patent Application JP 2016-035124 filed Feb. 26, 2016, the entire contents of which are incorporated herein by reference.

BACKGROUND

The present invention relates to a chromatic confocal sensor and a measurement method that uses it.

Figure 1:
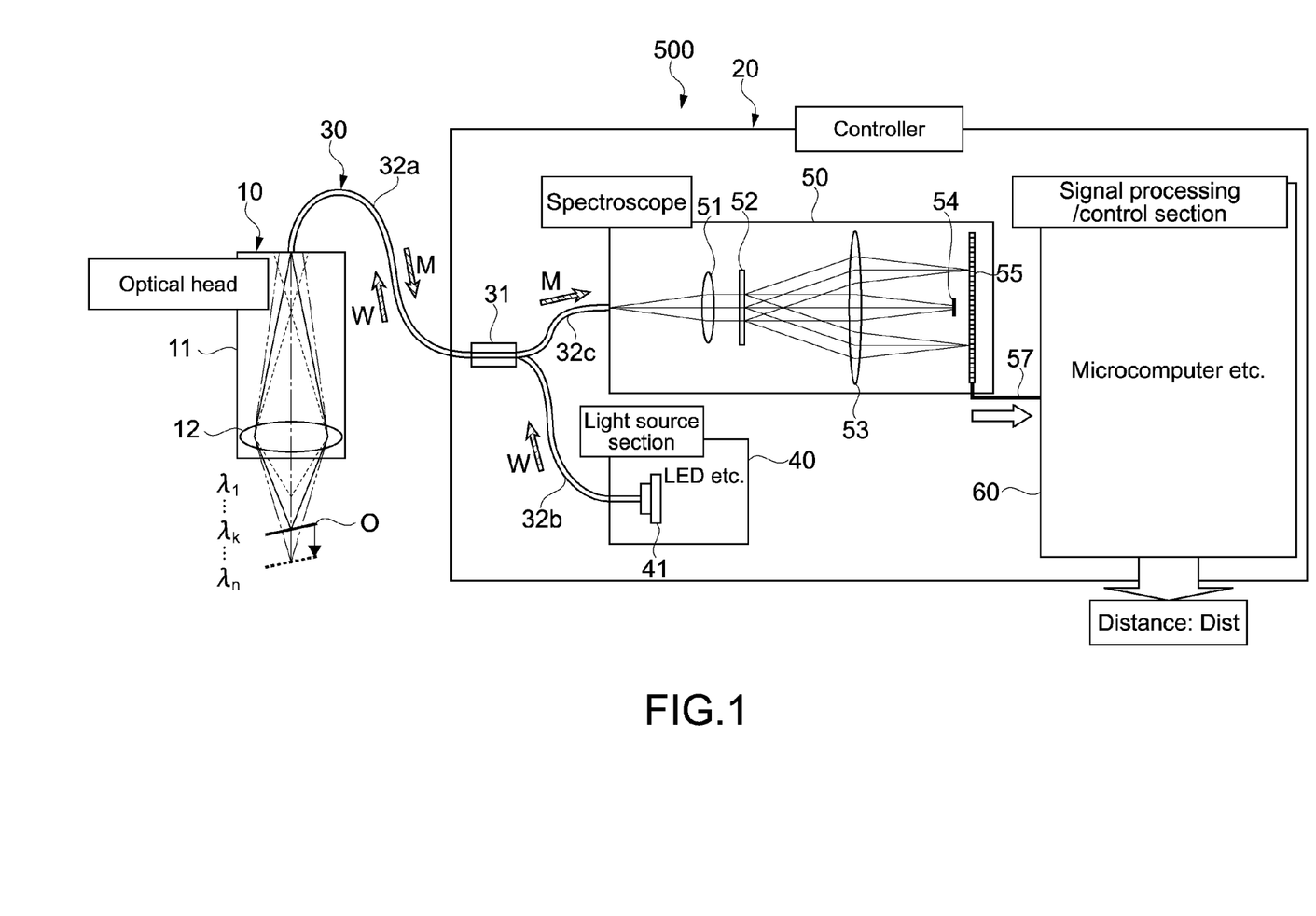
FIG. 1 is a schematic diagram showing a structural example of a chromatic confocal sensor according to a first embodiment.

From the past, the chromatic confocal technique has been used for measuring a height of an object to be measured and the like. For example, Japanese Patent Application Laid-open No. 2011-39026 (hereinafter, referred to as Patent Document 1) discloses a chromatic confocal displacement meter (hereinafter, referred to as chromatic sensor) as shown in FIG. 1. In the chromatic sensor, a color to be focused on a work changes on a one-on-one basis according to a height (displacement) of the work. By extracting light of a color to be focused on the work and specifying the color (optical wavelength), the height of the work that is in a one-on-one relationship with the color is measured (paragraphs [0002], [0003], etc. in specification of Patent Document 1).

In the chromatic sensor disclosed in Patent Document 1, specification of an optical wavelength is performed using the fact that a phase difference (optical channel difference) corresponding to an optical wavelength is caused between mutually-perpendicular polarization components that pass through a wave plate constituted of a birefringent crystal and the like. Accordingly, it becomes possible to realize a measurement that satisfies a long operating distance, a fine measurement spot, a small error due to a tilt, high resolution, and high-speed responsiveness at the same time (paragraphs [0030], [0035], etc. in specification of Patent Document 1).

SUMMARY

As described above, in the chromatic sensor, the position of an object to be measured is required to be measured with high accuracy based on a wavelength of measurement light that has been focused on and reflected by the object to be measured. Therefore, the wavelength of measurement light or a parameter corresponding to the wavelength needs to be detected with high accuracy.

In view of the circumstances as described above, the present invention aims at providing a chromatic confocal sensor capable of highly accurately calculating a position of an object to be measured based on a wavelength of measurement light reflected by the object to be measured at a focal position, and a measurement method that uses it.

To attain the object described above, according to an embodiment of the present invention, there is provided a chromatic confocal sensor including a light source section, an optical head, a spectroscope, and a signal processing/control section.

The light source section emits a plurality of light beams having different wavelengths.

The optical head includes an objective lens that converges the plurality of light beams at different focal positions and selects, as measurement light, light reflected by an object to be measured at the focal position out of the plurality of light beams.

The spectroscope includes diffraction gratings that split the selected measurement light into a plurality of diffracted light beams and a sensor that receives two or more of the plurality of diffracted light beams.

The signal processing/control section calculates a position of the object to be measured based on a difference between light reception positions of the two or more diffracted light beams received by the sensor.

In the chromatic confocal sensor, the measurement light reflected by the object to be measured at the focal position is split into a plurality of diffracted light beams. Further, the position of the object to be measured is calculated based on the difference between the light reception positions of the two or more diffracted light beams received by the sensor. Therefore, for example, even when the position of the diffraction gratings or position of the sensor is deviated, the positional deviation can be absorbed by using the difference between the light reception positions of the two or more diffracted light beams. As a result, the position of the object to be measured can be calculated highly accurately.

The two or more diffracted light beams may include at least two of +1-order, 0-order, and −1-order diffracted light beams.

By using the +1-order, 0-order, and −1-order diffracted light beams, the position of the object to be measured can be calculated accurately.

The signal processing/control section may calculate the position of the object to be measured based on a difference between light reception positions of the +1-order and −1-order diffracted light beams.

By using the difference between the light reception positions of the ±1-order diffracted light beams, the position of the object to be measured can be calculated accurately.

The signal processing/control section may calculate the position of the object to be measured based on a difference between a light reception position of either one of the +1-order and −1-order diffracted light beams and a light reception position of the 0-order diffracted light beam.

By using either one of the ±1-order diffracted light beams and the 0-order diffracted light beam, the apparatus can be made compact The signal processing/control section may calculate the position of the object to be measured based on a sum of a difference between light reception positions of the +1-order and 0-order diffracted light beams and a difference between light reception positions of the −1-order and 0-order diffracted light beams.

By using the three diffracted light beams, measurement accuracy can be improved.

The light source section may emit white light including the plurality of light beams.

Accordingly, measurement accuracy can be improved.

According to an embodiment of the present invention, there is provided a measurement method including emitting a plurality of light beams having different wavelengths.

The plurality of light beams are converged at different focal positions.

As measurement light, light reflected by an object to be measured at the focal position is selected out of the plurality of light beams.

The selected measurement light is split into a plurality of diffracted light beams, and two or more of the plurality of diffracted light beams are received by a sensor.

A position of the object to be measured is calculated based on a difference between light reception positions of the two or more diffracted light beams received by the sensor.

As described above, according to the present invention, the position of the object to be measured can be calculated highly accurately based on the wavelength of measurement light reflected by the object to be measured at the focal position. It should be noted that the effects described herein are not necessarily limited, and any of the effects described in the present disclosure may be obtained.

DETAILED DESCRIPTION OF EMBODIMENTS

Hereinafter, embodiments of the present invention will be described with reference to the drawings.

<First Embodiment>

FIG. 1 is a schematic diagram showing a structural example of a chromatic confocal sensor according to a first embodiment of the present invention. In the descriptions below, the chromatic confocal sensor will simply be referred to as chromatic sensor.

The chromatic sensor 100 includes an optical head 10, a controller 20, and an optical fiber section 30. The controller 20 includes a light source section 40, a spectroscope 50, and a signal processing/control section (hereinafter, simply referred to as control section) 60.

The optical fiber section 30 includes a fiber splitter 31. The fiber splitter 31 splits light introduced from an optical fiber 32a and derives the light to each of optical fibers 32b and 32c. On the other hand, light introduced from each of the optical fibers 32b and 32c is derived to the optical fiber 32a. As shown in FIG. 1, the optical head 10 is connected to the optical fiber 32a, and the light source section 40 and the spectroscope 50 are respectively connected to the optical fibers 32b and 32c. It should be noted that an optical fiber coupler may be used in place of the fiber splitter 31.

Figure 2:
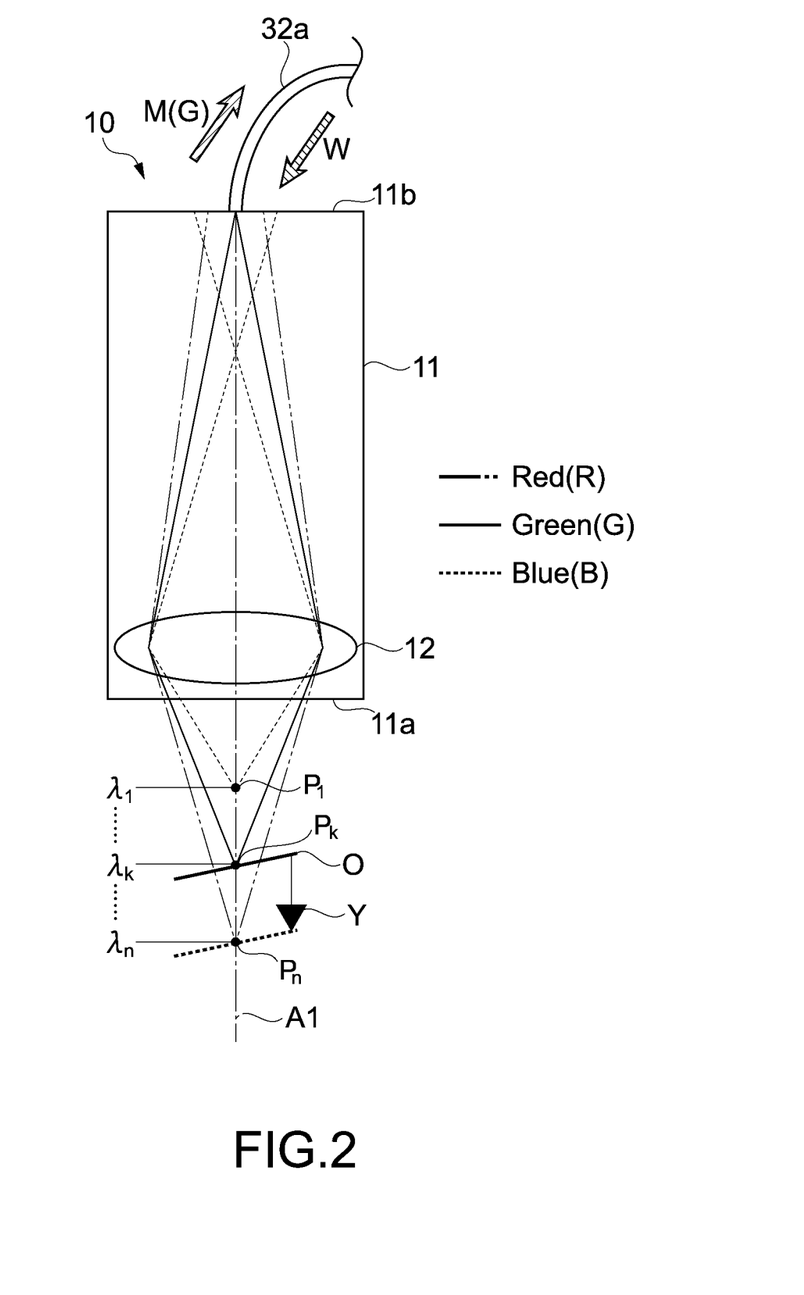
FIG. 2 is an enlarged diagram of an optical head shown in FIG. 1.

FIG. 2 is an enlarged diagram of the optical head 10 shown in FIG. 1. The optical head 10 includes a pen-shaped casing section 11 having an optical axis A1 in a longitudinal direction thereof and an objective lens 12 provided inside the casing section 11. The optical fiber 32a is connected at substantially the center of a rear-end section 11b of the casing section 11. Light emitted from the optical fiber 32a is irradiated toward an object to be measured O from a front-end section 11a of the casing section 11 via the objective lens 12.

As shown in FIG. 2, the objective lens 12 is a lens having a large chromatic aberration and converges light emitted from the optical fiber 32a at a focal position P corresponding to a wavelength λ on the optical axis A1. In this embodiment, white light W including a plurality of visible light beams having different wavelengths from a blue wavelength range to a red wavelength range is irradiated toward the objective lens 12 from the optical fiber 32a. The objective lens 12 causes the plurality of visible light beams included in the white light W to converge at different focal positions P corresponding to the wavelengths λ.

FIG. 2 shows a plurality of visible light beams split by the objective lens 12 toward the front side (lower side in figure) from the objective lens 12. Here, light beams of 3 colors of RGB are illustrated representatively. It should be noted that the plurality of visible light beams correspond to the plurality of light beams having different wavelengths in this embodiment.

The wavelength λ1 and focal position P1 represent the wavelength and focal position of visible light having a shortest wavelength out of the plurality of visible light beams and correspond to blue light B in this embodiment. The wavelength λn and focal position Pn represent the wavelength and focal position of visible light having a longest wavelength out of the plurality of visible light beams and correspond to red light R in this embodiment. The wavelength λk and focal position Pk represent the wavelength and focal position of arbitrary visible light out of the plurality of visible light beams and correspond to green light G in FIG. 2 (k=1 to n).

Moreover, the objective lens 12 causes the visible light reflected by the object to be measured O at the focal position Pk to converge at the optical fiber 32a. Therefore, the optical fiber 32a connected to the rear-end section 11b of the casing section 11 is connected at a confocal position at which the visible light focused on and reflected by the object to be measured O is converged by the objective lens 12. Accordingly, visible light reflected by the object to be measured O at the focal position Pk out of the plurality of visible light beams can be selected as measurement light M.

In FIG. 2, light beams of 3 colors of RGB reflected by the object to be measured O are illustrated between the objective lens 12 and the optical fiber 32a. In the example shown in FIG. 2, the object to be measured O is present at the focal position (focal position of green light G in figure). Therefore, green light G reflected by the object to be measured O is converged at the optical fiber 32a. As a result, the green light G is selected as the measurement light M. As described above, the wavelength of measurement light M and the position of the object to be measured O on the optical axis A1 are in a one-on-one relationship.

The optical system of this embodiment is realized by the casing section 11 and the optical fiber 32a and objective lens 12 that are arranged in a predetermined positional relationship in the casing section 11. It should be noted that the structure that functions as the optical system is not limited. For example, a pinhole or the like may be used for selecting the measurement light M. Further, other lenses such as a collimator lens may be used in addition to the objective lens 12.

The light source section 40 shown in FIG. 1 emits white light W. The specific structure of the light source section 40 is not limited, and a solid-state light source such as an LED or an arbitrary light source 41 such as a mercury lamp may be used. The white light W emitted from the light source section 40 is emitted inside the optical head 10 via the optical fiber 32*b*, the fiber splitter 31, and the optical fiber 32*a*.

Figure 3:
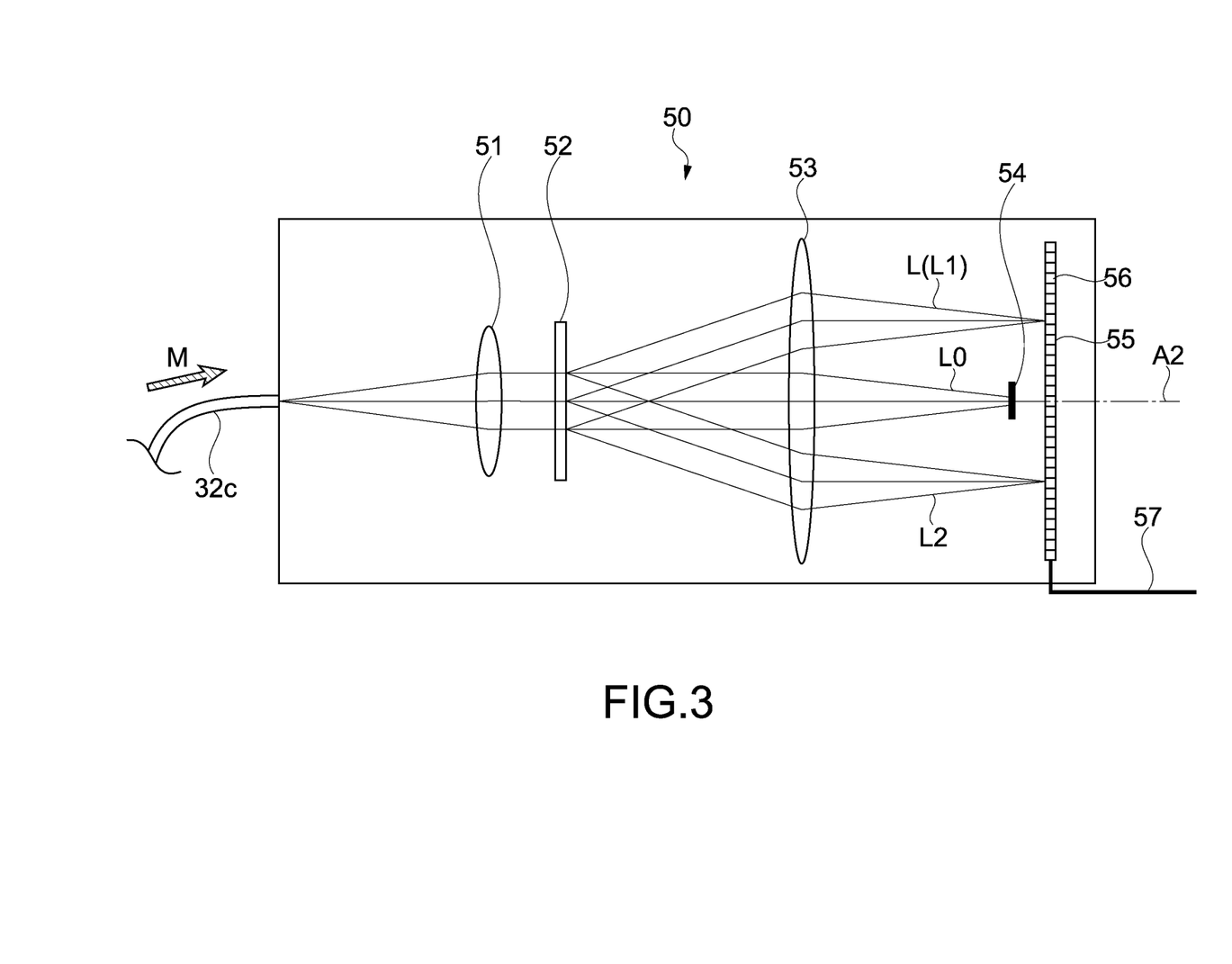
FIG. 3 is an enlarged diagram of a spectroscope shown in FIG. 1.

FIG. 3 is an enlarged diagram of the spectroscope 50 shown in FIG. 1. The spectroscope 50 is a block for detecting a wavelength of the measurement light M delivered to the optical fiber 32*a* from the optical head 10. The measurement light M is irradiated inside the spectroscope 50 via the optical fiber 32*a*, the fiber splitter 31, and the optical fiber 32*c*.

The spectroscope 50 includes a collimator lens 51, diffraction gratings 52, an imaging lens 53, a light shield plate 54, and a linear sensor 55. As shown in FIG. 3, those members are arranged such that the members become orthogonal to an optical axis A2 (center axis of light flux) of the measurement light M emitted from the optical fiber 32*c* and the center portion of each of the members is positioned on the optical axis A2.

The collimator lens 51 substantially uniformly irradiates the measurement light M emitted from the optical fiber 32*c* onto the diffraction gratings 52. The diffraction gratings 52 split the measurement light M into a plurality of diffracted light beams L. The diffraction gratings 52 typically cause two ±n-order diffracted light beams L to appear at a position substantially symmetrical with respect to 0-order diffracted light. The specific structure of the diffraction gratings 52 is not limited, and an arbitrary structure may be used.

The imaging lens 53 is capable of imaging, in spots, each of the plurality of diffracted light beams L generated by the diffraction gratings 52 on the linear sensor 55. In this embodiment, +1-order, 0-order, and −1-order diffracted light beams L1, L0, and L2 emitted from the respective gratings (slits) of the diffraction gratings 52 enter the imaging lens 53 to be emitted toward the linear sensor 55. It should be noted that in FIG. 3, only the diffracted light beams from three gratings are illustrated for simplifying the figure.

The light shield plate 54 shields the 0-order diffracted light beam L0 emitted toward the linear sensor 55 from the imaging lens 53. Therefore, in this embodiment, the two ±1-order diffracted light beams L1 and L2 are imaged on the linear sensor 55.

The linear sensor 55 includes a plurality of pixels (light reception devices) 56 arranged in one direction. Each pixel 56 outputs a signal corresponding to an intensity of received light. The specific structure of the linear sensor 55 is not limited, and a C-MOS line sensor, a CCD line sensor, or the like is used, for example.

It should be noted that the imaging lens 53 shown in FIG. 3 is a lens having a small chromatic aberration and is capable of imaging the ±1-order diffracted light beams L1 and L2 in spots on the linear sensor 55 irrespective of the wavelength of the measurement light M. On the other hand, an emission angle of the diffracted light beams L emitted from the diffraction grating 52 depends on the wavelength of the measurement light M. Therefore, positions of spots on the linear sensor 55 become parameters corresponding to the wavelength of the measurement light M.

In this embodiment, the linear sensor 55 corresponds to a sensor that receives two or more diffracted light beams out of the plurality of visible light beams. Moreover, a detection section of this embodiment is realized by the diffraction grating 52 and the linear sensor 55.

Signals output from the linear sensor 55 are transmitted to the control section 60 shown in FIG. 1 via a signal cable 57. It should be noted that a light shield mechanism or the like may be provided inside the spectroscope 50 so that diffracted light excluding the ±1-order diffracted light beams L1 and L2 does not enter the linear sensor 55.

The control section 60 functions as a calculation section in this embodiment and calculates the position of the object to be measured O based on signals received from the linear sensor 55. For example, the optical head 10 is held at a predetermined reference position, and a plurality of visible light beams are irradiated onto the object to be measured O. Then, based on the signals from the linear sensor 55, the position of the object to be measured O is calculated with the reference position being a reference. Alternatively, it is also possible for positional information of the optical head 10 to be obtained so that the positional information is used for calculating the position of the object to be measured O.

As the position of the object to be measured O, a distance between the optical head 10 and the object to be measured O may be calculated. Even when the object to be measured O moves, a movement amount of the object to be measured O can be calculated based on the signals from the linear sensor 55 that are output in correspondence with the movement (see, for example, arrow Y of FIG. 2).

When the optical head 10 is used above the object to be measured O, the height of the object to be measured O is calculated as the position of the object to be measured O, though of course not limited thereto. It is also possible for the optical head 10 to be used in an arbitrary direction and a position in that direction be calculated.

The control section 60 can be realized by a microcomputer in which a CPU, a memory (RAM, ROM), an I/O (Input/Output), and the like are accommodated in a single chip, for example. Various types of processing of the microcomputer are executed by the CPU in the chip operating according to a predetermined program stored in the memory, though not limited thereto. For realizing the control section 60, other ICs (integrated circuits) or the like may be used as appropriate.

Figure 4:
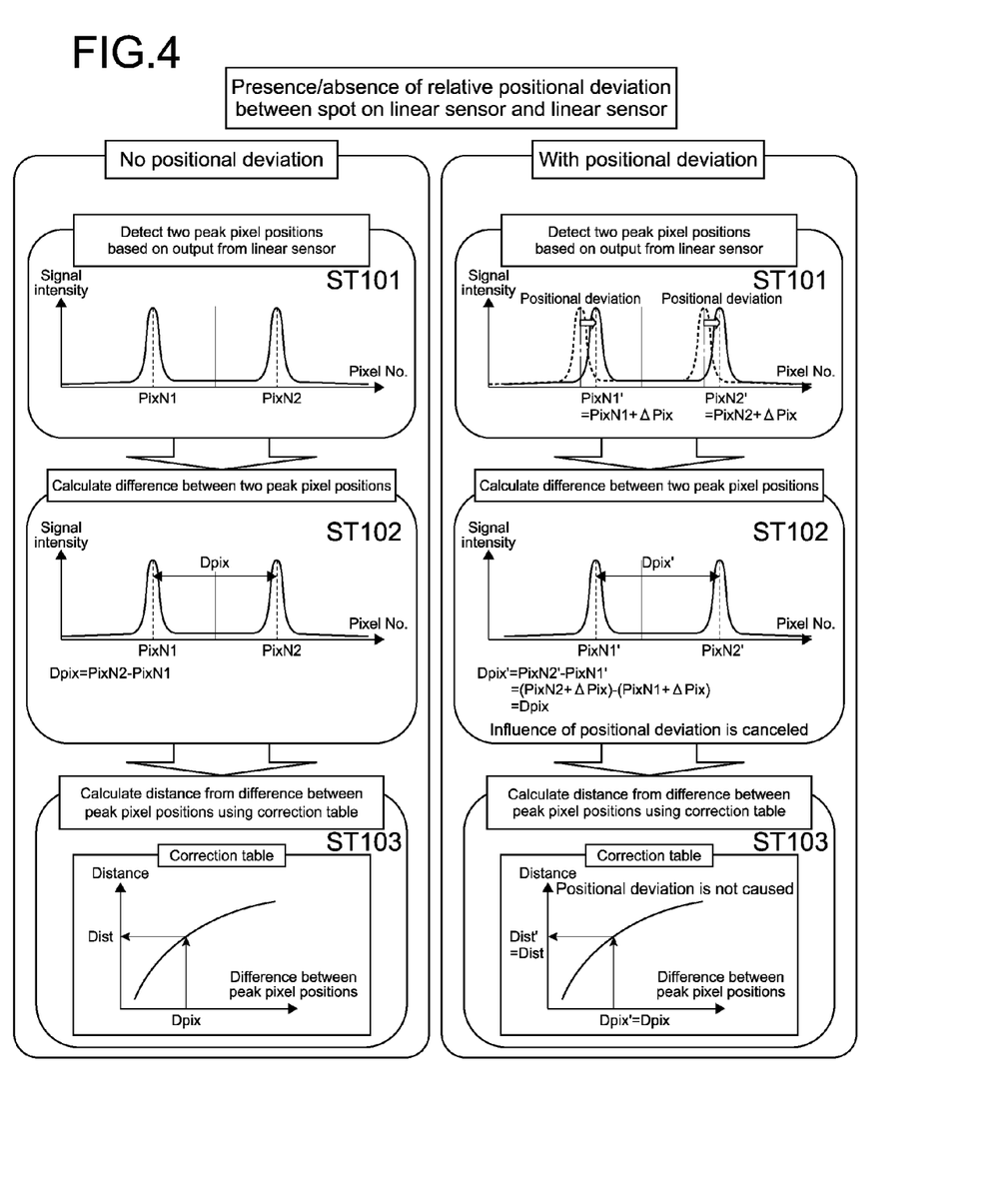
FIG. 4 is a flowchart showing a calculation example of a position of an object to be measured, that is calculated by a control section.

FIG. 4 is a flowchart showing a calculation example of the position of the object to be measured O, that is calculated by the control section 60. First, descriptions will be given while referring to the flowchart at a normal time when a relative positional deviation is not caused between the spots of diffracted light beams L imaged on the linear sensor 55 and the linear sensor 55.

In Step 101 (ST101), the position of the pixel 56 that outputs a signal intensity peak value (peak pixel position) is detected based on a signal output from the linear sensor 55. The peak pixel position corresponds to a light reception position of each of the two or more diffracted light beams received by the sensor.

In this embodiment, the peak pixel position of the +1-order diffracted light beam L1 and the peak pixel position of the −1-order diffracted light beam L2 are detected. In this embodiment, pixel numbers PixN are detected as they are as the peak pixel positions. Hereinafter, the peak pixel positions of the ±1-order diffracted light beams L1 and L2 are referred to as PixN1 and PixN2, respectively.

In Step 102 (ST102), a difference Dpix between the two peak pixel positions is calculated by the following expression.

$$D\text{pix} = \text{Pix}N2 - \text{Pix}N1$$

The difference Dpix is calculated by subtracting a pixel number having a small value from a pixel number having a large value at all times, for example. Alternatively, an absolute value of the difference between the two pixel numbers may be calculated as the difference Dpix (see FIGS. 7A and 7B of third embodiment).

In Step 103 (ST103), the position of the object to be measured O (referred to as distance Dist herein) is calculated based on the difference Dpix. As described above, the position of spots on the linear sensor 55 corresponds to the wavelength of the measurement light M. Therefore, the difference Dpix between the peak pixel positions PixN1 and PixN2 of the ±1-order diffracted light beams L1 and L2 also becomes a parameter corresponding to the wavelength of the measurement light M. As a result, the distance Dist can be calculated based on the difference Dpix.

As shown in FIG. 4, in this embodiment, the distance Dist is calculated from the difference Dpix by using a correction table. The correction table is created in advance by operating the chromatic sensor 100 while adjusting the distance Dist and is stored in the memory of the control section 60 or the like. The method of creating the correction table, the creation timing, and the like are not limited.

The calculation of the distance Dist is not limited to the method of using the correction table. For example, it is also possible for a predetermined operational expression to be stored in the memory or the like so that the distance Dist is calculated from the difference Dpix using the operational expression. Alternatively, the wavelength of the measurement light M may be calculated from the difference Dpix. In addition, the distance Dist may be calculated from the wavelength using the correction table, operation, and the like.

Descriptions will be given on a case where a relative positional deviation is caused between the spot of the diffracted light beam L imaged on the linear sensor 55 and the linear sensor 55. For example, the diffraction grating 52 and the linear sensor 55 are sometimes positionally deviated due to environmental fluctuations based on temperatures, humidity, and the like, conditions during transportation of the chromatic sensor, long-time use, and the like. In such a case, a relative positional deviation is caused between the spot on the linear sensor 55 and the linear sensor 55.

When the method of measuring the distance Dist according to the present invention is executed in the case where the positional deviation is caused, referring to the flowchart of the case where there is a positional deviation in FIG. 4, peak pixel positions PixN1' and PixN2' of the ±1-order diffracted light beams L1 and L2 are calculated first in Step 101 (ST101). Since there is a positional deviation, the peak pixel positions are detected while being deviated only by ΔPix corresponding to the positional deviation amount as shown in the following expressions.

PixN1'=PixN1+ΔPix

PixN2'=PixN2+ΔPix

In this measurement method, however, since a difference Dpix' between two peak pixel positions is calculated in Step 102 (ST102), an influence of the positional deviation is canceled as shown in the following expression.

$$Dpix' = PixN2' - PixN1'$$
$$= (PixN2 + \Delta Pix) - (PixN1 + \Delta Pix)$$
$$= PixN2 - PixN1$$
$$= Dpix$$

Therefore, in Step 103 (ST103), the distance Dist in the case where a positional deviation is not caused is calculated appropriately. In other words, in this measurement method, the relative positional deviation between the spot on the linear sensor 55 and the linear sensor 55 does not influence the calculation of the distance Dist.

Figure 5A:
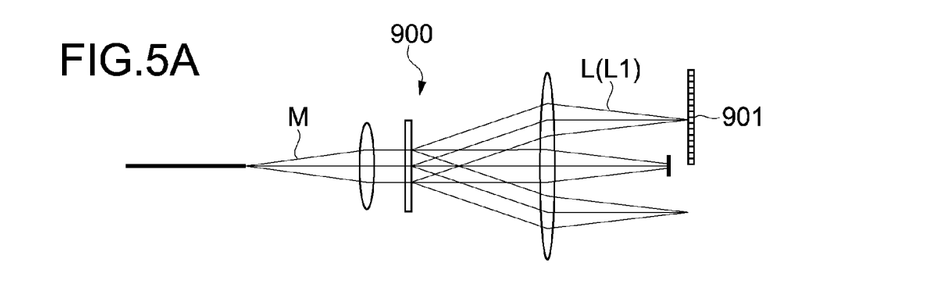
FIGS. 5A and 5B are diagrams for explaining a structure of a spectroscope of a chromatic sensor as a comparative example and a measurement method that uses it.

FIGS. 5A and 5B are diagrams for explaining a structure of a spectroscope of a chromatic sensor as a comparative example and a measurement method that uses it. As shown in FIG. 5A, in the chromatic sensor 900, only the +1-order diffracted light beam L1 out of the plurality of diffracted light beams L of the measurement light M is imaged on a linear sensor 901.

Figure 5B:
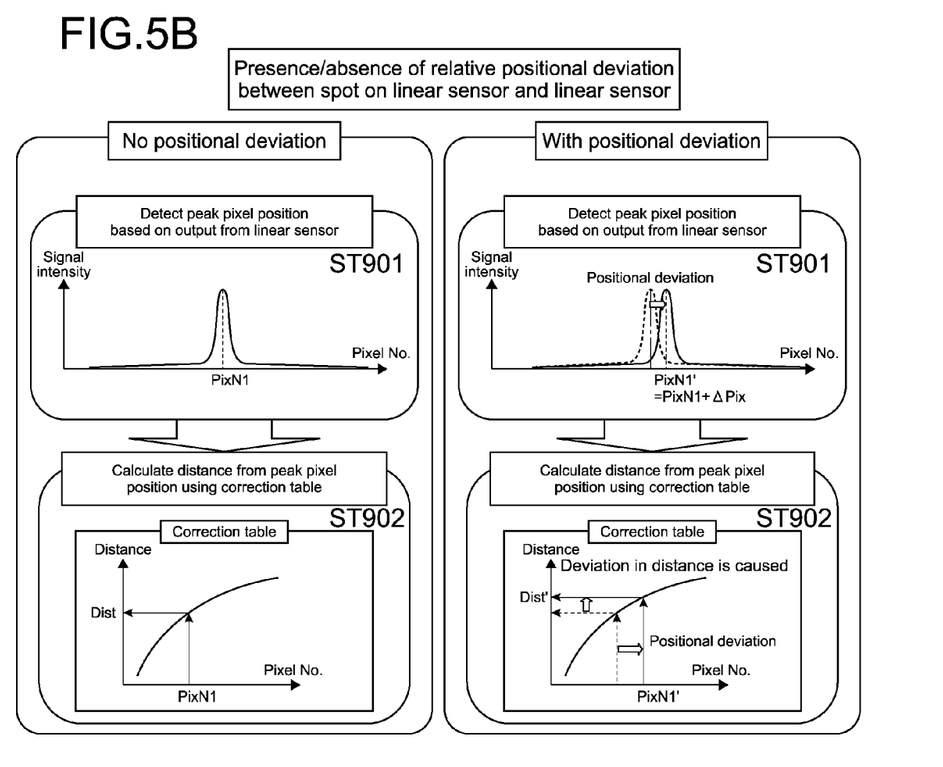

As shown in FIG. 5B, in Step 901 (ST901), the peak pixel position PixN1 of the +1-order diffracted light beam L1 is detected. In Step 902 (ST902), the distance Dist is calculated based on the detected PixN1 using the correction table.

In the chromatic sensor 900, when a relative positional deviation is caused between a spot on the linear sensor 901 and the linear sensor 901, PixN1'(=PixN1+ΔPix) that is deviated only by ΔPix corresponding to the positional deviation amount is calculated as the peak pixel position. Then, in Step 902 (ST902), the distance Dist' is calculated based on the PixN1'. As a result, a deviation is caused in the calculated distance. In other words, since the deviation amount of the peak pixel position appears as it is as a change in the distance measurement result, measurement accuracy is lowered.

In contrast, in the chromatic sensor 100 of this embodiment, the position of the object to be measured O is calculated based on a difference between the peak pixel positions PixN1 and PixN2 of the ±1-order diffracted light beams L1 and L2 received by the linear sensor 55. Therefore, the relative positional deviation between the spot on the linear sensor 55 and the linear sensor 55 can be absorbed. As a result, it becomes possible to highly accurately calculate the position of the object to be measured O based on the wavelength of the measurement light M reflected by the object to be measured O at the focal position P. Further, a highly-accurate chromatic sensor 100 that is robust with respect to an environmental change can be realized.

<Second Embodiment>

A chromatic sensor according to a second embodiment of the present invention will be described. In the descriptions below, descriptions on structures and operations of a chromatic sensor 200 that are similar to those described in the above embodiment will be omitted or simplified.

Figure 6A:
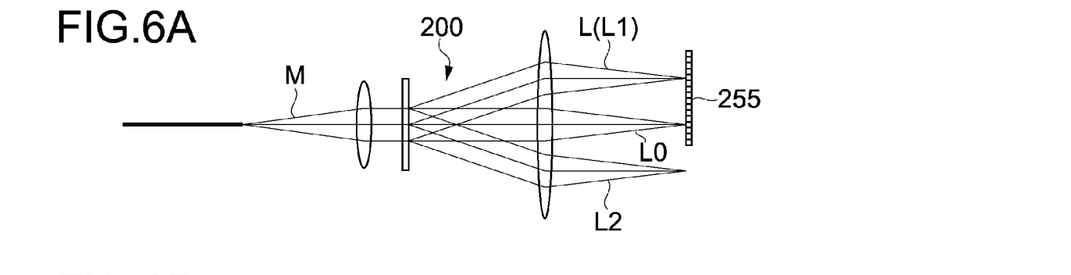
FIGS. 6A and 6B are diagrams for explaining a structure of a spectroscope of a chromatic sensor according to a second embodiment and a measurement method that uses it.
Figure 6B:
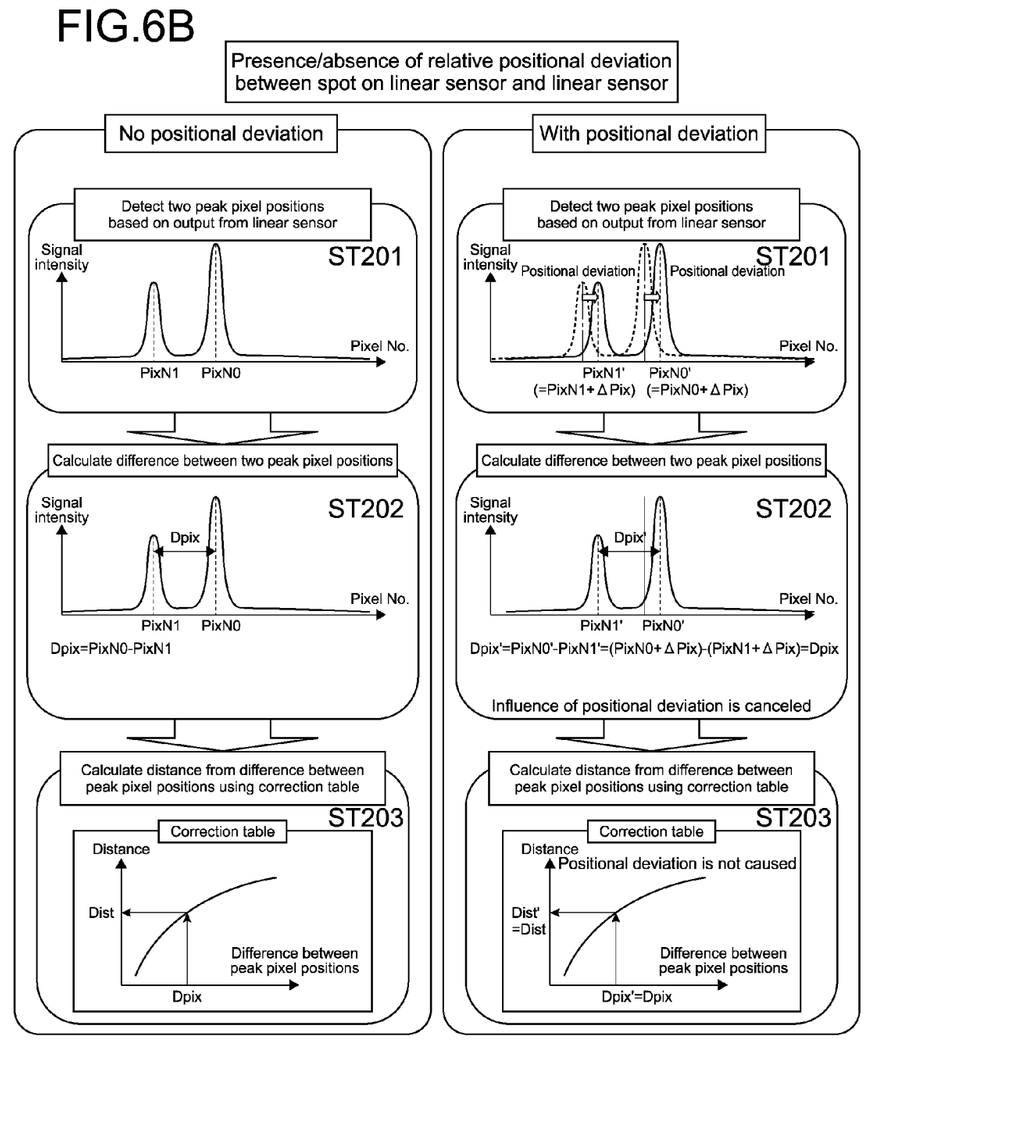

FIGS. 6A and 6B are diagrams for explaining a structure of a spectroscope of the chromatic sensor of this embodiment and a measurement method that uses it.

As shown in FIG. 6A, in the chromatic sensor 200 of this embodiment, the +1-order diffracted light beam L1 and 0-order diffracted light beam L0 out of the plurality of diffracted light beams L of the measurement light M are imaged on a linear sensor 255.

In the control section, the peak pixel position PixN1 of the +1-order diffracted light beam L1 and the peak pixel position PixN0 of the 0-order diffracted light beam L0 are detected in Step 201 (ST201) as shown in FIG. 6B. It should be noted that the plurality of diffracted light beams L generally have a stronger optical intensity as orders thereof become smaller. In consideration of this fact, it is possible to detect a peak value corresponding to the order as appropriate to thus detect the peak pixel positions PixN1 and PixN0 of the +1-order and 0-order diffracted light beams L1 and L0.

A difference Dpix (=PixN0−PixN1) between the two peak pixel positions is calculated in Step 202 (ST202), and the distance Dist is calculated based on the difference Dpix in Step 203 (ST203).

When a positional deviation is caused in the chromatic sensor 200, the positional deviation amount ΔPix is canceled during calculation of a difference Dpix' in Step 202 (ST202) as shown in the following expression.

$$Dpix' = PixN0' - PixN1'$$
$$= (PixN0 + \Delta Pix) - (PixN1 + \Delta Pix)$$
$$= PixN0 - PixN1$$
$$= Dpix$$

Therefore, in Step 203 (ST203), the distance Dist can be calculated highly accurately without being influenced by the relative positional deviation between the spot on the linear sensor 255 and the linear sensor 255. It should be noted that the similar effect is exerted even when the −1-order diffracted light beam L2 is used in place of the +1-order diffracted light beam L1.

In the chromatic sensor 200 of this embodiment, since the size of the linear sensor 255 can be made small as shown in FIG. 6A, the apparatus can be made compact.

<Third Embodiment>

Figure 7A:
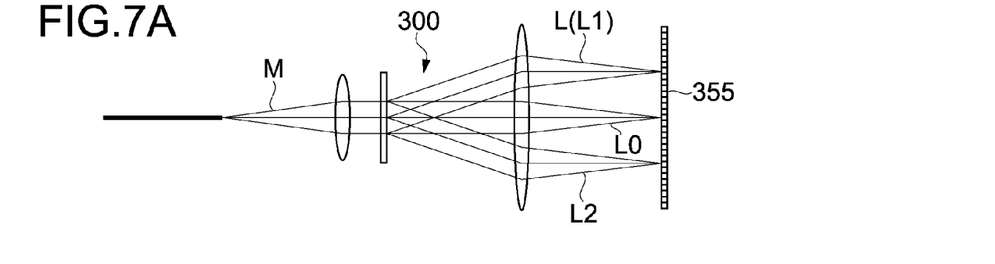
FIGS. 7A and 7B are diagrams for explaining a structure of a spectroscope of a chromatic sensor according to a third embodiment and a measurement method that uses it.

FIGS. 7A and 7B are diagrams for explaining a structure of a spectroscope of a chromatic sensor according to a third embodiment and a measurement method that uses it. As shown in FIG. 7A, in the chromatic sensor 300 of this embodiment, the +1-order, 0-order, and −1-order diffracted light beams L1, L0, and L2 out of the plurality of diffracted light beams L of the measurement light M are imaged on a linear sensor 355.

Figure 7B:
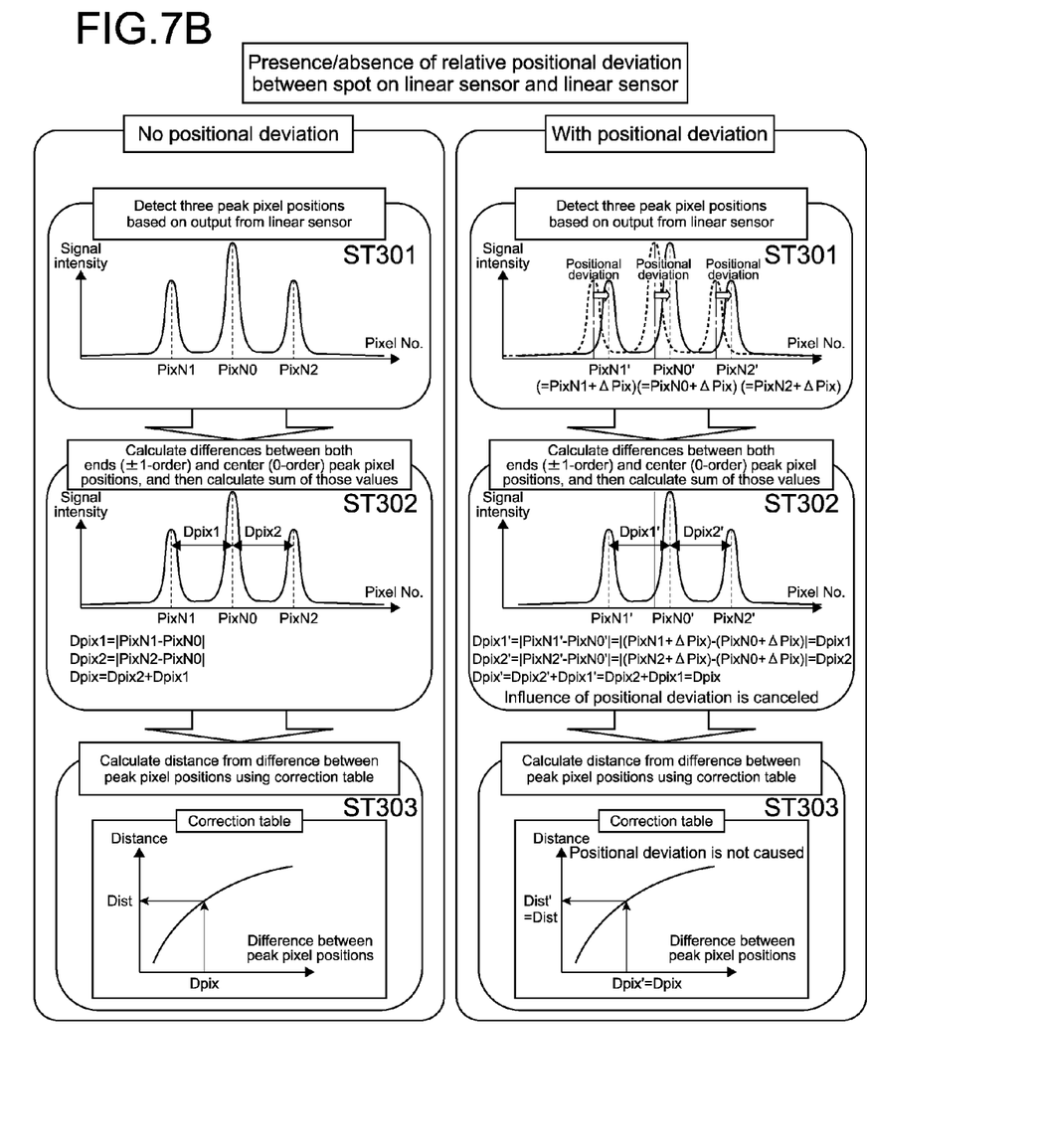

In the control section, the peak pixel position PixN1 of the +1-order diffracted light beam L1, the peak pixel position PixN0 of the 0-order diffracted light beam L0, and the peak pixel position PixN2 of the −1-order diffracted light beam L2 are detected in Step 301 (ST301) as shown in FIG. 7B.

In Step 302 (ST302), a difference Dpix1 between the peak pixel positions PixN1 and PixN0 and a difference Dpix2 between the peak pixel positions PixN2 and PixN0 are calculated as shown in the following expressions.

$$Dpix1=|PixN1-PixN0|$$

$$Dpix2=|PixN2-PixN0|$$

Moreover, as shown in the following expression, a sum Dpix of the differences Dpix1 and Dpix2 is calculated.

$$Dpix=Dpix1+Dpix2$$

It should be noted that when calculating the differences Dpix1 and Dpix2, an absolute value of (PixN1−PixN0) and an absolute value of (PixN2−PixN0) do not need to be calculated. In this case, when calculating Dpix, absolute values of Dpix1 and Dpix2 are calculated and added.

In Step 303 (ST303), the distance Dist is calculated based on the calculated sum Dpix. It should be noted that the sum Dpix obtained by adding the difference Dpix1 between the peak pixel positions PixN1 and PixN0 and the difference Dpix2 between the peak pixel positions PixN2 and PixN0 becomes a parameter calculated based on the difference between the light reception positions of the two or more diffracted light beams.

When a positional deviation is caused in the chromatic sensor 300, the positional deviation amount ΔPix is canceled when calculating the differences Dpix1' and Dpix2' in Step 302 (ST302) as shown in the following expressions.

$$Dpix1' = |PixN1' - PixN0'|$$
$$= |(PixN1 + \Delta Pix) - (PixN0 + \Delta Pix)|$$
$$= |PixN1 - PixN0|$$
$$= Dpix1$$

$$Dpix2' = |PixN2' - PixN0'|$$
$$= |(PixN2 + \Delta Pix) - (PixN0 + \Delta Pix)|$$
$$= |PixN2 - PixN0|$$
$$= Dpix2$$

Therefore, in Step 303 (ST303), the distance Dist can be calculated highly accurately without being influenced by the relative positional deviation between the spot on the linear sensor 355 and the linear sensor 355. Moreover, by using the sum Dpix obtained by adding the difference Dpix1 between the peak pixel positions PixN1 and PixN0 and the difference Dpix2 between the peak pixel positions PixN2 and PixN0 with the 0-order diffracted light beam L0 being a reference, measurement accuracy can be improved.

<Other Embodiments>

The present invention is not limited to the embodiments described above, and various other embodiments can also be realized.

In the embodiments above, the +1-order, 0-order, and −1-order diffracted light beams are used as appropriate out of the plurality of diffracted light beams. Since those diffracted light beams have high optical intensities, the position of the object to be measured O can be calculated highly accurately. However, it is also possible to use diffracted light beams of other orders excluding the +1-order, 0-order, and −1-order and calculate the position of the object to be measured based on a difference between light reception positions thereof.

In the measurement method of the present invention, the position of the object to be measured is detected based on a difference between light reception positions of two or more diffracted light beams. Therefore, it is also possible to use diffraction gratings that cause two ±n-order diffracted light beams to appear at a position that does not become substantially symmetrical with respect to 0-order diffracted light. Furthermore, as long as the two or more diffracted light beams are received by the linear sensor, members such as the diffraction gratings may be arranged in a direction oblique to the optical axis of measurement light emitted to the inside of the spectroscope.

Further, white light is used as light including the plurality of visible light beams. However, the present invention is not limited thereto, and the present invention is also applicable to a case where other light of a large bandwidth is used. In other words, invisible ultraviolet rays, infrared rays, and the like may be emitted as the plurality of light beams having different wavelengths. For example, LEDs that emit ultraviolet rays can be used as the light source section of the present invention.

At least two of the feature portions of the embodiments described above may be combined. Furthermore, the various effects described above are mere examples and should not be limited, and other effects may also be obtained.

What is claimed is:

1. A chromatic confocal sensor, comprising:
   a light source section that emits a plurality of light beams having different wavelengths;
   an optical head that includes an objective lens that converges the plurality of light beams at different focal positions and selects, as measurement light, light reflected by an object to be measured at the focal position out of the plurality of light beams;

a spectroscope including diffraction gratings that split the selected measurement light into a plurality of diffracted light beams, a sensor that receives two or more of the plurality of diffracted light beams and an imaging lens disposed between the diffraction gratings and the sensor, the imaging lens imaging each of the plurality of diffracted light beams in spots on the sensor; and a signal processing/control section that calculates a position of the object to be measured based on a difference between light reception positions of the two or more diffracted light beams received by the sensor.

2. The chromatic confocal sensor according to claim 1, wherein the two or more diffracted light beams include at least two of +1-order, 0-order, and −1-order diffracted light beams.

3. The chromatic confocal sensor according to claim 2, wherein the signal processing/control section calculates the position of the object to be measured based on a difference between light reception positions of the +1-order and −1-order diffracted light beams.

4. The chromatic confocal sensor according to claim 3, wherein the light source section emits white light including the plurality of light beams.

5. The chromatic confocal sensor according to claim 2, wherein the signal processing/control section calculates the position of the object to be measured based on a difference between a light reception position of either one of the +1-order and −1-order diffracted light beams and a light reception position of the 0-order diffracted light beam.

6. The chromatic confocal sensor according to claim 5, wherein the light source section emits white light including the plurality of light beams.

7. The chromatic confocal sensor according to claim 2, wherein the signal processing/control section calculates the position of the object to be measured based on a sum of a difference between light reception positions of the +1-order and 0-order diffracted light beams and a difference between light reception positions of the −1-order and 0-order diffracted light beams.

8. The chromatic confocal sensor according to claim 7, wherein the light source section emits white light including the plurality of light beams.

9. The chromatic confocal sensor according to claim 2, wherein the light source section emits white light including the plurality of light beams.

10. The chromatic confocal sensor according to claim 1, wherein the light source section emits white light including the plurality of light beams.

11. The chromatic confocal sensor according to claim 1, wherein the diffraction gratings, the imaging lens and the sensor are arranged orthogonal to an optical axis of the selected measurement light.

12. The chromatic confocal sensor according to claim 1, wherein a center portion of each of the diffraction gratings, the imaging lens and the sensor is positioned on an optical axis of the selected measurement light.

13. The chromatic confocal sensor according to claim 1, wherein an emission angle of each of the plurality of diffracted light beams emitted from the diffraction gratings corresponds to a wavelength of the selected measurement light, and the imaging lens is capable of imaging each of the plurality of diffracted light beams in spots on the sensor irrespective of the wavelength of the selected measurement light.

14. A measurement method, comprising:

emitting a plurality of light beams having different wavelengths;

converging the plurality of light beams at different focal positions;

selecting, as measurement light, light reflected by an object to be measured at the focal position out of the plurality of light beams;

splitting the selected measurement light into a plurality of diffracted light beams, imaging two or more of the plurality of diffracted light beams in spots on a sensor, and receiving, by the sensor, the two or more of the plurality of diffracted light beams; and calculating a position of the object to be measured based on a difference between light reception positions of the two or more diffracted light beams received by the sensor.

15. The measurement method according claim 14, wherein an emission angle of each of the plurality of diffracted light beams corresponds to a wavelength of the selected measurement light, and imaging the two or more of the plurality of diffracted light beams in spots on the sensor irrespective of the wavelength of the selected measurement light.

* * * * *